Oct. 7, 1924.
B. JEROME
1,511,200
INDIVIDUAL CRANK PIN OILING SYSTEM
Filed April 17, 1922
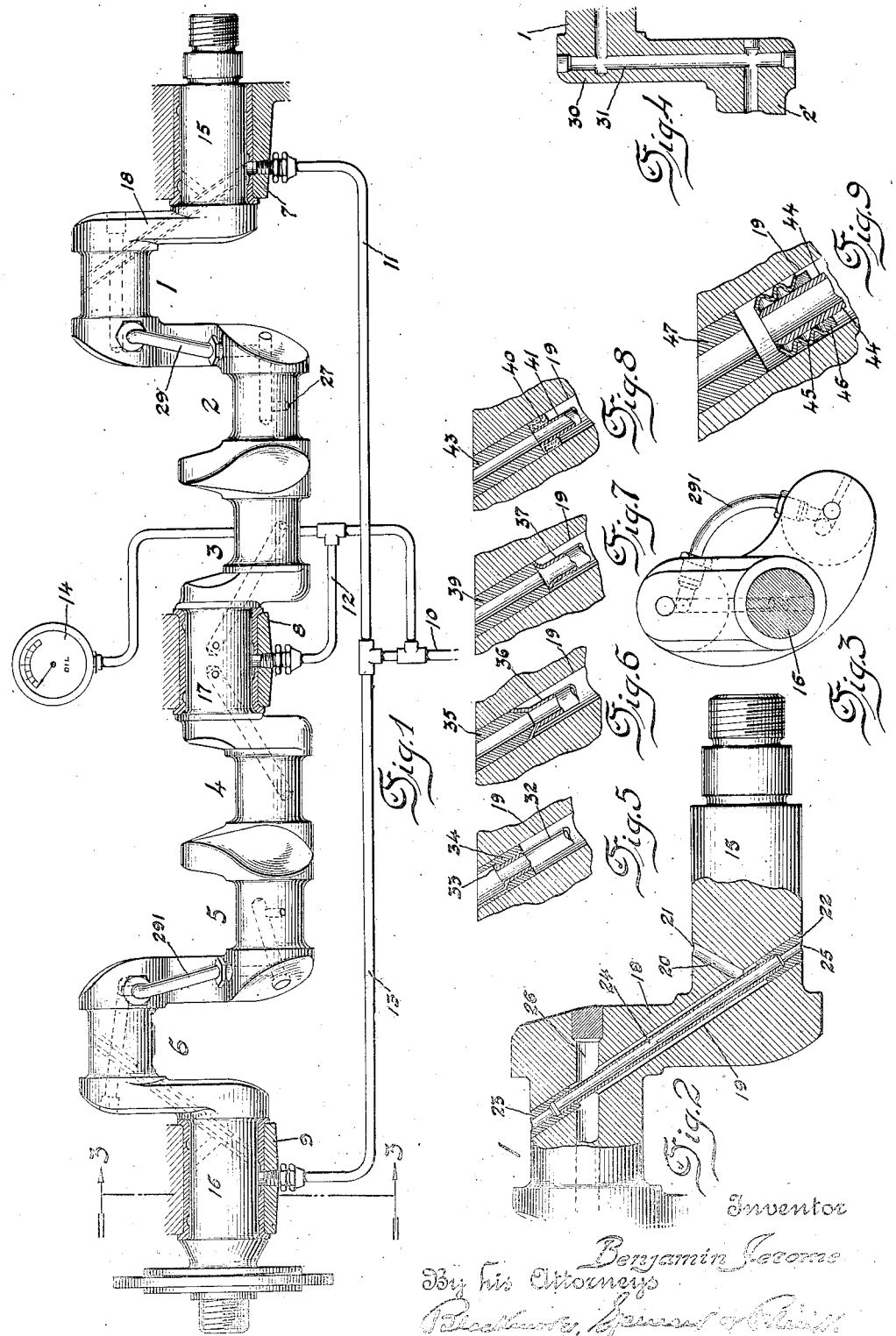

Patented Oct. 7, 1924.

1,511,200

UNITED STATES PATENT OFFICE.

BENJAMIN JEROME, OF PONTIAC, MICHIGAN, ASSIGNOR TO GENERAL MOTORS CORPORATION, OF DETROIT, MICHIGAN, A CORPORATION OF DELAWARE.

INDIVIDUAL CRANK-PIN-OILING SYSTEM.

Application filed April 17, 1922. Serial No. 554,061.

*To all whom it may concern:*

Be it known that I, BENJAMIN JEROME, a citizen of the United States of America, and a resident of Pontiac, county of Oakland, and State of Michigan, have invented certain new and useful Improvements in Individual Crank-Pin-Oiling Systems, of which the following is a full, clear, concise, and exact description, such as will enable others skilled in the art to which the invention relates to make and use the same, reference being made therein to the accompanying drawings, which form a part of this specification.

My invention relates to means for lubricating the main supporting and crank pin bearings of crank shafts having a plurality of crank pins; and the principal object thereof is to provide an improved lubricating system or device whereby a more satisfactory and efficient supply of oil or other lubricant to the several bearings between the crank pins of multiple throw crank shafts and the lower ends of piston rods connected therewith will be secured, than has heretofore commonly been the case.

A further object of my invention is to provide an improved lubricating system of the class described and wherein lubricating material derived from a main supporting bearing of the crank shaft is supplied to each crank pin bearing independent of the supply to every other crank pin; so that each pin and bearing thereat receives an independent supply of oil direct from said main bearing, and which supply is in no way affected or influenced by or dependent upon the supply of oil to the other crank pin bearings of the crank shaft.

A further object of my invention is to provide such a lubricating system wherein the supply of oil to each individual crank pin will be in no way influenced by the conditions present at any other crank pin; so that should any particular bearing be too loose so as to permit undue leakage of oil therefrom, or should the flow thereto be unduly restricted or otherwise interfered with, such circumstance will have no effect upon the supply of oil to the bearings at the other crank pins.

A further object of my invention is to provide a lubricating system for multiple throw crank shafts wherein each crank pin bearing receives a predetermined quantity of oil from a main crank shaft bearing; and which quantity is definitely determined to satisfy the lubricating needs at such bearing, thus economizing in the use of oil throughout the system and securing a more efficient use thereof at the several crank pin bearings.

With the above and other objects of invention in view, my invention consists in the improved lubricating device or system for multiple throw crank shafts illustrated in the accompanying drawing and hereinafter described and claimed; and in such variations and modifications thereof, within the scope of the concluding claims, as will be obvious to those skilled in the art to which my invention relates.

In the drawing accompanying and forming a part of this specification, and wherein the preferred embodiment of my invention is illustrated:

Figure 1 is a view showing a crank shaft and bearings therefor of a six-cylinder internal combustion engine or equivalent device, the crank pins of which are supplied with oil in accordance with my invention.

Figure 2 is a sectional view upon a larger scale showing a portion of the crank shaft at the right hand end thereof.

Figure 3 is a view showing a section upon a transverse plane indicated by the line 3—3, Figure 1, the main bearing being omitted.

Figure 4 is a fragmentary sectional view showing a modified arrangement of oil passage used when adjacent crank pins are disposed opposite one another, instead of 120 degrees apart.

Figures 5 to 9 are fragmentary views showing modified forms of a detail of my invention.

Referring now to the drawing which is largely schematic in character as only so much of the engine or like device is shown as is necessary to an understanding of my invention, the crank shaft shown therein as stated is one having six crank pins numbered 1 to 6 inclusive to which the ends of a like number of connecting rods are to be connected, said shaft being supported in three main bearings 7, 8 and 9 as is usual in engines and like devices. Oil under pressure is supplied to said main bearings through a conduit 10 and branches 11, 12 and 13 leading one to each bearing, and the usual gauge 14 to indicate the pressure of oil in the system is shown as used. A part of the oil thus supplied to the main bearings is conducted along the shaft to the several crank pins to lubricate the bearings between them and the connecting rods assumed to be present, and the oil which is supplied to the system after lubricating the several bearings escapes into a closed crank case, and is returned from the lower end thereof to the bearings through the supply conduit 10, as is usual in lubricating systems.

The end portions of the crank shaft whereby it is rotatably supported in the end main bearings 7, 9 are designated by the reference numerals 15, 16; and the central bearing portion supported by the bearing 8 by the numeral 17. The crank pins 3 and 4 are supplied with oil from said central main bearing through passages drilled in the crank shaft and shown in dotted lines, although not described in detail as my invention is described herein and explained in connection with the two crank pins 1, 2 and 6, 5 at each end of the shaft which lie closest to and receive their supply of oil from the outer main bearings 7, 9. Furthermore, and inasmuch as the oil supplying means is the same at each end of the shaft it will be sufficient to confine this description to one end thereof, the means whereby oil is supplied to the crank pins 1 and 2 at the right hand end of the shaft being chosen in explaining my invention hereinafter in this specification.

Extending through the crank arm 18 which connects the main bearing portion 15 with the crank pin 1 is a passage 19 formed by drilling therethrough; and 20 designates an inclined passage communicating with the said passage 19 and having a port 21 at its outer end in the surface of the bearing portion 15 of the shaft, and located opposite the end of the passage 19 in said portion.

The ends of the passage 19 in the bearing portion 15 and in the crank pin 1 are fitted with hollow plugs or bushings 22, 23; and 24 designates a tube the ends of which are supported in these bushings and through which oil may flow from an inlet port 25 in the bushing 22 to the bearing between the crank pin 1 and the connecting rod connected therewith, but which oil may not escape into the passage 19 along which said tube extends.

Oil may, however, flow into the passage 19 through the port 21 and inclined passage 20, and from said passage 19 through a passage 26 in the crank pin 1 and through a continuing passage to the crank pin 2 at which it escapes through a port 27 to lubricate the bearing between said pin and the connecting rod connected therewith. In crank shafts like the one illustrated wherein successive cranks stand 120 degrees apart as shown in Figure 3 this continuing passage is for convenience preferably made up in part of a curved tube 29 (or 291 in Figure 3) the ends of which communicate with passages in the two crank pins to be lubricated; but in crank shafts wherein successive or next adjacent pins are disposed opposite one another the connecting passage may be formed entirely in the arm whereby the cranks are connected, as is the case with the cranks 1' and 2', the arm 30 and the connecting passage 31 shown in Figure 4 of the drawing.

In view of the premises it will be appreciated that when during the rotation of the crank shaft the port 25 comes into communication with the oil supply conduit 11, as by overrunning the open end thereof or registering with a groove in the bearing which communicates with said conduit, or otherwise, oil will be supplied through the said port and through the tube 24 to the crank pin 1 and to the bearing between the same and the connecting rod connected therewith.

It will be appreciated that oil supplied through the port 25 and tube 24 can under no circumstances reach any crank pin other than the pin 1. When, however, further movement of the crank shaft brings the port 21 into communication with the oil supply conduit oil will flow through said port and the passage 20 into the passage 19; and along said passage and through the passages 26 and 29, and through the port 27 to the crank pin 2 to lubricate the bearing thereat; it being appreciated that oil thus supplied through the port 21 can find its way to no crank pin other than the pin 2.

It therefore follows that each crank pin receives a supply of oil though a conduit which supplies oil to no other crank pin; the supply to each pin being independent of the supply to every other pin and in no way affected by the condition of the bearing at another pin, as is the case when oil is supplied to several successive crank pins through a single passage and wherein leakage due to looseness at a bearing close to the source of oil under pressure often interrupts the supply of oil to a more remote bearing of the series.

The connections between the ends of the tube 24 and the plugs at the ends of the passage 19 can be made in various ways other than by providing the plugs with recesses within which the ends of the tube lie, as in the form of my invention hereinbefore described. Thus, and referring to Figures 5 to 9 which show several forms of connection at one end of the tube (a similar connection being assumed to be used at the other end in each case), Figure 5 shows the end of the tube 32 turned outward at 33 and over an inwardly extending ledge 34 of the plug at the end of the passage 19. Figure 6 shows the plug 35 as tapered at its inner end and as fitting within the flared end of the tube 36; and Figure 7 shows the end of the tube 37 as outwardly flared so as to center it in the passage 19. Figure 8 shows a packing gland or washer 40 surrounding the unflared end of the tube 41 so as to space it properly within the passage 19; while Figure 9 shows upon a larger scale the tube 44 as having a corrugated tube 45 soldered at 46 thereto, and which corrugated tube will be collapsed about the end of the tube 44 as said last mentioned tube is forced along the passage 19 and after the end of said corrugated tube engages the inner end of the plug 47. A similar corrugated tube at the lower end of the tube 44 will then lie just inside the passage 19 so that when the lower plug is driven into the said passage 19 the lower corrugated tube will be distorted to form a tight joint at said lower end, as will be understood. In Figures 7 and 8 the plugs 39 and 43 are shown somewhat longer than in Figures 5 and 6 which, however, is an unimportant detail feature of my invention, as will be understood.

Having thus described and explained my invention, I claim and desire to secure by Letters Patent:

1. In combination with a main crank shaft bearing, and a crank shaft supported therein and having a plurality of crank pins; a conduit through which oil may be supplied under pressure to said main bearing; and two concentric conduits separate and independent of one another and having oppositely arranged inlet ports located in the main bearing portion of said crank shaft, and which conduits lead one to one and the other to another crank pin both located upon one and the same side of said main bearing.

2. In combination with a main crank shaft bearing, and a crank shaft supported therein and having a plurality of crank pins; a conduit through which oil may be supplied under pressure to said main bearing; and a plurality of concentric conduits separate and independent of one another and leading one to each of said crank pins; said conduits having inlet ports located in the main bearing portion of said crank shaft and spaced apart from one another, and which ports are so arranged as to communicate with said oil supply conduit each independently of the other and each during a small portion only of the rotation of the crank shaft, as the crank shaft rotates.

3. A crank shaft having a main bearing portion, two crank pins, and a passage having a port located in said main bearing portion and through which passage oil may be supplied to the crank pin the more remote from said main bearing portion; and a tube located within and extending along said passage and having an inlet port located also in said main bearing portion, and through which tube oil may be supplied to the crank pin which is the closer to said main bearing portion.

4. In combination with a main crank shaft bearing, and a crank shaft rotatable therein and having a plurality of crank pins; a conduit through which oil may be supplied under pressure to said main bearing; and means for supplying oil to each of said crank pins independently of the supply of oil to the other pin or pins; said means comprising a plurality of concentric conduits extending along said crank shaft, one to each of said crank pins, and the inlet ends of which conduits are so arranged as to derive oil from said oil supply conduit.

5. In combination with a main crank shaft bearing, and a crank shaft rotatable therein and having a plurality of crank pins; means for supplying oil under pressure to said main bearing; a conduit having an inlet port located in the portion of the crank shaft which is supported in said main bearing and so arranged as to derive oil from said oil supply means, and which conduit leads along said crank shaft to one of the crank pins aforesaid; and a second conduit arranged within and extending along said first mentioned conduit and having an inlet port located also in the portion of the crank shaft which is supported in said main bearing, and which port is also arranged so as to derive oil from said oil supply means, and which second conduit leads along said crank shaft to another of said crank pins.

In testimony whereof I affix my signature.

BENJAMIN JEROME.